(12) United States Patent
Ho et al.

(10) Patent No.: US 11,588,367 B2
(45) Date of Patent: Feb. 21, 2023

(54) MOTOR AND ELECTRICAL PRODUCT

(71) Applicant: NIDEC CORPORATION, Kyoto (JP)

(72) Inventors: Quang Danh Ho, Kyoto (JP); Yuhei Yamaguchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 92 days.

(21) Appl. No.: 17/329,154

(22) Filed: May 25, 2021

(65) Prior Publication Data

US 2021/0376684 A1    Dec. 2, 2021

(30) Foreign Application Priority Data

May 26, 2020    (CN) .......................... 202010452835.6

(51) Int. Cl.
*H02K 5/16* (2006.01)
*F16C 35/00* (2006.01)
*H02K 7/08* (2006.01)

(52) U.S. Cl.
CPC .............. *H02K 5/161* (2013.01); *F16C 35/00* (2013.01); *H02K 7/083* (2013.01); *F16C 2380/26* (2013.01)

(58) Field of Classification Search
CPC ........ H02K 5/161; H02K 7/083; F16C 35/00; F16C 2380/26

USPC .......................................................... 310/90
See application file for complete search history.

(56) References Cited

U.S. PATENT DOCUMENTS 10,862,363 B2    12/2020    Ogawa et al.
10,903,711 B2    1/2021    Ogawa et al.

*Primary Examiner* — Terrance L Kenerly
(74) *Attorney, Agent, or Firm* — JCIPRNET

(57) ABSTRACT

Provided is a motor including: a rotor, a stator, a first and second bearing, a support member, a housing including a first flat part and a cylindrical part, and a bearing holder. The cylindrical part includes: a first inner circumferential surface inside which is provided the stator; a second inner circumferential surface, a distance from the second inner circumferential surface to a central axis being greater than a distance from the first inner circumferential surface to the central axis, and the second inner circumferential surface contacting an outer circumferential surface of the bearing holder; and a stepped surface, connecting the first and the second inner circumferential surfaces, and contacting a lower surface of the bearing holder. The housing further includes a riveting part located on the second inner circumferential surface of the cylindrical part and fixing the bearing holder to the second inner circumferential surface of the cylindrical part.

10 Claims, 7 Drawing Sheets

MOTOR AND ELECTRICAL PRODUCT

CROSS REFERENCE TO RELATED APPLICATIONS

The present invention claims priority under 35 U.S.C. § 119 to Chinese Application No. 202010452835.6 filed on May 26, 2020, the entire content of which is incorporated herein by reference.

FIELD OF THE INVENTION

Embodiments of the disclosure relate to the field of electromechanics, in particular to a motor and an electrical product.

BACKGROUND

Currently, in order to fix a busbar holder to a motor housing, press processing (such as riveting) may be performed with a pin or the like on an upper surface of a bearing holder. A recess and a pressing part are provided on the bearing holder after the press processing.

The inventors found that, since the recess and the pressing part are provided on the upper surface of the bearing holder, it would be necessary to provide the recess and the pressing part radially and circumferentially separated from a through hole that allows a coil wire to pass therethrough. As a result, the design is limited. In addition, as motors are reducing in size, there is limited space on the upper surface of the bearing holder for the recess and the pressing part.

It should be noted that the Background section is only to provide a clear and complete description of technical solutions of the disclosure and to facilitate the understanding of those skilled in the art. The technical solutions should not be considered well-known to those skilled in the art only because they are described in the Background section.

SUMMARY

An exemplary embodiment of the disclosure provides a motor, including: a rotor, rotating about a central axis; a stator, located radially outside the rotor and provided opposite the rotor, having multiple coils wound therearound; a first bearing and a second bearing, rotatably supporting the rotor relative to the stator; a support member, located on an axially upper side of the stator and holding a conductive member that supplies power to the multiple coils; a housing, including a first flat part extending radially and a cylindrical part extending axially upward from a radially outer edge of the first flat part, thereby defining an opening that opens on an axially upper side, the first flat part holding the first bearing, the cylindrical part accommodating the rotor and the stator radially inside thereof; and a bearing holder, provided on the axially upper side of the stator, holding the second bearing, and having at least one through hole. The conductive member and/or a lead wire of the coils extends toward an upper side of the bearing holder through the through hole. The cylindrical part includes: a first inner circumferential surface, the stator being provided inside the first inner circumferential surface; a second inner circumferential surface, a distance from the second inner circumferential surface to the central axis being greater than a distance from the first inner circumferential surface to the central axis, and the second inner circumferential surface contacting an outer circumferential surface of the bearing holder; and a stepped surface, connecting the first inner circumferential surface and the second inner circumferential surface, and contacting a lower surface of the bearing holder. The housing further includes a riveting part located on the second inner circumferential surface of the cylindrical part. The bearing holder is fixed to the second inner circumferential surface of the cylindrical part by the riveting part.

The above and other elements, features, steps, characteristics and advantages of the present disclosure will become more apparent from the following detailed description of the preferred embodiments with reference to the attached drawings.

BRIEF DESCRIPTION OF THE DRAWINGS

The accompanying drawings provide a further understanding of the embodiments of the disclosure, which constitute a part of the specification, illustrate implementations of the disclosure, and together with the description, serve to explain principles of the disclosure. Obviously, the drawings described below are only some embodiments of the disclosure, and one of ordinary skill in the art may obtain other drawings based on these drawings without paying creative work.

DETAILED DESCRIPTION

In the description and drawings, specific implementations of the disclosure are specifically disclosed, which indicate some implementations in which the principles of the disclosure may be adopted. It will be understood that the disclosure is not limited to the described implementations but includes all modifications, variations and equivalents falling within the scope of the appended claims.

In the embodiments of the disclosure, the term "and/or" includes any and all combinations of one or more of the associated listed items. The terms such as "including" and "having" are intended to specify the presence of stated features, elements, devices or components, but do not exclude the presence or addition of one or more other features, elements, devices or components.

In the embodiments of the disclosure, the singular forms "a", "an" and "the" are intended to include the plural forms as well, unless the context clearly indicates otherwise. In addition, the term "according to" should be understood as "according at least in part to", and the term "based on" should be understood as "based at least in part on," unless the context clearly indicates otherwise.

In addition, in the following description of the disclosure, for the convenience of description, a direction extending along or parallel to a central axis of (such as a central axis O) of a motor is referred to as an "axial direction;" a radial direction centered on the central axis O is referred to as a "radial direction;" a direction toward the central axis O is referred to as "radially inward;" a direction away from the central axis O is referred to as "radially outward;" a direction surrounding the central axis O is referred to as a "circumferential direction;" a side where a flat part of a housing of a motor is located is referred to as a lower side; and a side opposite the lower side is referred to as an upper side. However, the above are only for the convenience of description, and do not limit the orientation of the motor during use and manufacture.

The implementation of the embodiments of the disclosure will be described below with reference to the drawings.

An embodiment of the disclosure provides a motor.

Figure 1:
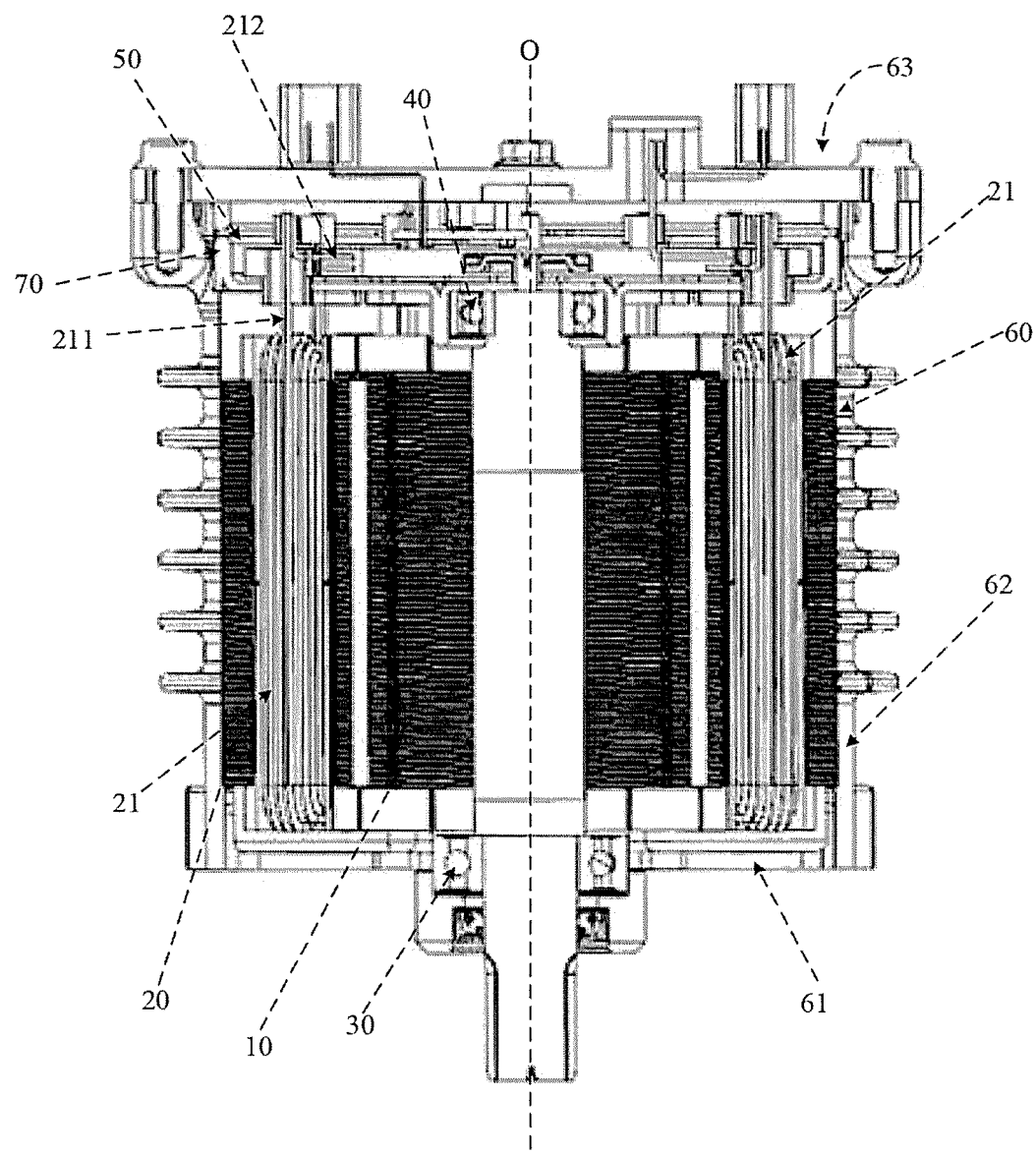
FIG. 1 is a schematic view of a cross section of a motor of an embodiment of the disclosure.

FIG. 1 is a schematic view of a cross section of a motor of an embodiment of the disclosure. As shown in FIG. 1, the motor includes a rotor 10, a stator 20, a first bearing 30, a second bearing 40, a support member 50, a housing 60, and a bearing holder 70.

In an embodiment of the disclosure, the rotor 10 rotates about the central axis O. The stator 20 is located radially outside the rotor 10 and is provided opposite the rotor 10. The stator 20 has multiple coils 21 wound therearound. The first bearing 30 and the second bearing 40 rotatably support the rotor 10 relative to the stator 20. The support member 50 is located on an axially upper side of the stator 20 and holds a conductive member 212 that supplies power to the coils 21. The housing 60 includes a first flat part 61 extending radially and a cylindrical part 62 extending axially upward from a radially outer edge of the first flat part 61, thereby defining an opening 63 that opens on an axially upper side. The first flat part 61 holds the first bearing 30, and the cylindrical part 62 accommodates the rotor 10 and the stator 20 radially inside thereof (that is, inside the cylindrical part 62). The bearing holder 70 is provided on the axially upper side of the stator 20, holds the second bearing 40 and has at least one through hole (not shown in FIG. 1). The conductive member 212 and/or a lead wire 211 of the coils 21 extend toward an upper side of the bearing holder 70 through the through hole.

Figure 2:
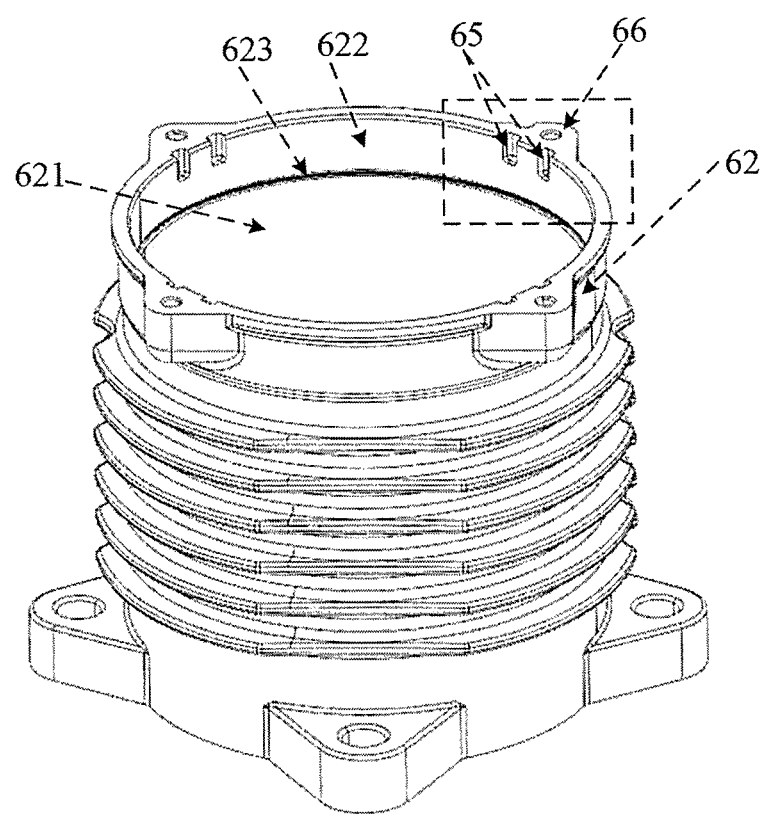
FIG. 2 is a schematic view of a housing of a motor of an embodiment of the disclosure.
Figure 3:
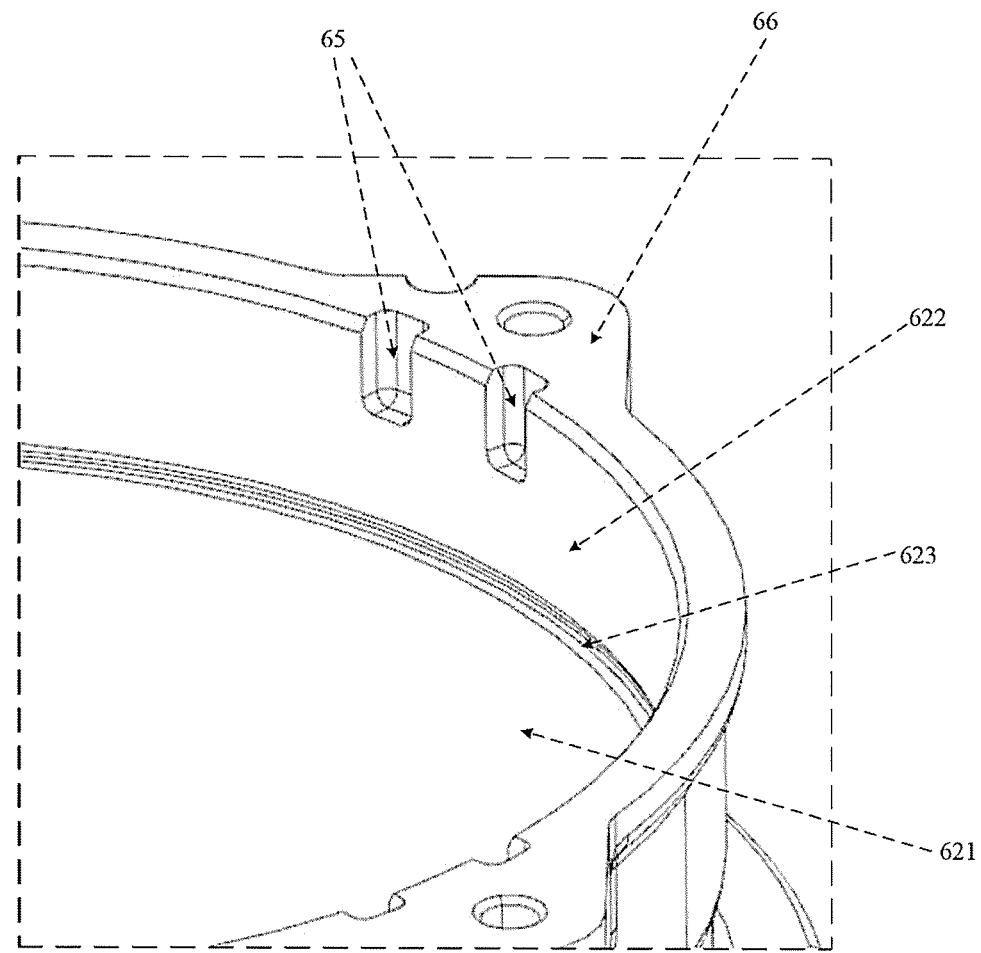
FIG. 3 is a schematic view of a cylindrical part of the housing shown in FIG. 2.
Figure 4:
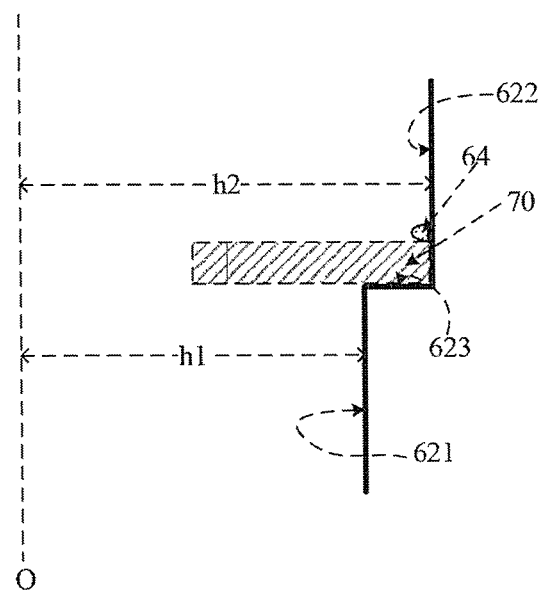
FIG. 4 is a schematic view of an inner circumferential surface of the cylindrical part shown in FIG. 3.

FIG. 2 is a schematic view of the housing 60 of the motor of an embodiment of the disclosure, in which the cylindrical part 62 is shown. FIG. 3 is a partially enlarged schematic view of the cylindrical part 62 of the housing 60 shown in FIG. 2. FIG. 4 is a schematic view of an inner circumferential surface of the cylindrical part 62 shown in FIG. 3.

As shown in FIG. 2 to FIG. 4, in an embodiment of the disclosure, the cylindrical part 62 includes a first inner circumferential surface 621, a second inner circumferential surface 622, and a stepped surface 623. The stator 20 is provided inside the first inner circumferential surface 621. A distance h2 from the second inner circumferential surface 622 to the central axis O is greater than a distance h1 from the first inner circumferential surface 621 to the central axis O. Moreover, the second inner circumferential surface 622 contacts an outer circumferential surface of the bearing holder 70. The stepped surface 623 connects the first inner circumferential surface 621 and the second inner circumferential surface 622, and contacts a lower surface of the bearing holder 70.

In an embodiment of the disclosure, as shown in FIG. 4, the housing 60 further includes a riveting part 64. The riveting part 64 is located on the second inner circumferential surface 622 of the cylindrical part 62. The bearing holder 70 is fixed to the second inner circumferential surface 622 of the cylindrical part 62 by the riveting part 64.

According to this structure, by fixing the bearing holder by riveting, limitations on the disposition of the through hole are able to be reduced.

In some embodiments, the stepped surface 623 contacts the lower surface of the bearing holder 70 and bears a load when the cylindrical part 62 of the housing 60 is riveted.

In some embodiments, the bearing holder 70 may be fixed to the second inner circumferential surface 622 of the housing 60 by hot press fitting or press fitting or the like and then be riveted.

In some embodiments, the conductive member 212 is a busbar, and the support member 50 is a busbar holder. The busbar is fixed to the busbar holder by molding or thermal welding. The disclosure is not limited thereto. The conductive member 212 may also be the lead wire 211 extending from the coils 21. In this case, the support member 50 holds the lead wire 211.

In some embodiments, the bearing holder 70 preferably includes a metal material. Accordingly, the second bearing 40 is able to be more firmly held. However, the disclosure is not limited thereto. The bearing holder 70 may include other materials.

In some embodiments, the support member 50 preferably includes a resin material. Accordingly, a portion of the support member 50 is located inside the through hole, thereby preventing the conductive member such as a busbar or a coil lead wire from contacting and short-circuiting with the bearing holder 70 that includes metal. However, the disclosure is not limited thereto. The support member 50 may include other non-conductive materials, and the aforementioned effects can still be achieved.

In some embodiments, as shown in FIG. 3, the housing 60 further includes a groove 65. The groove 65 is located on the second inner circumferential surface 622 and extends axially. The riveting part 64 is located at an axially lower end of the groove 65. Accordingly, a riveting tool T is able to be easily positioned, and the riveting part 64 with high accuracy is able to be provided on the housing 60.

Figure 5:
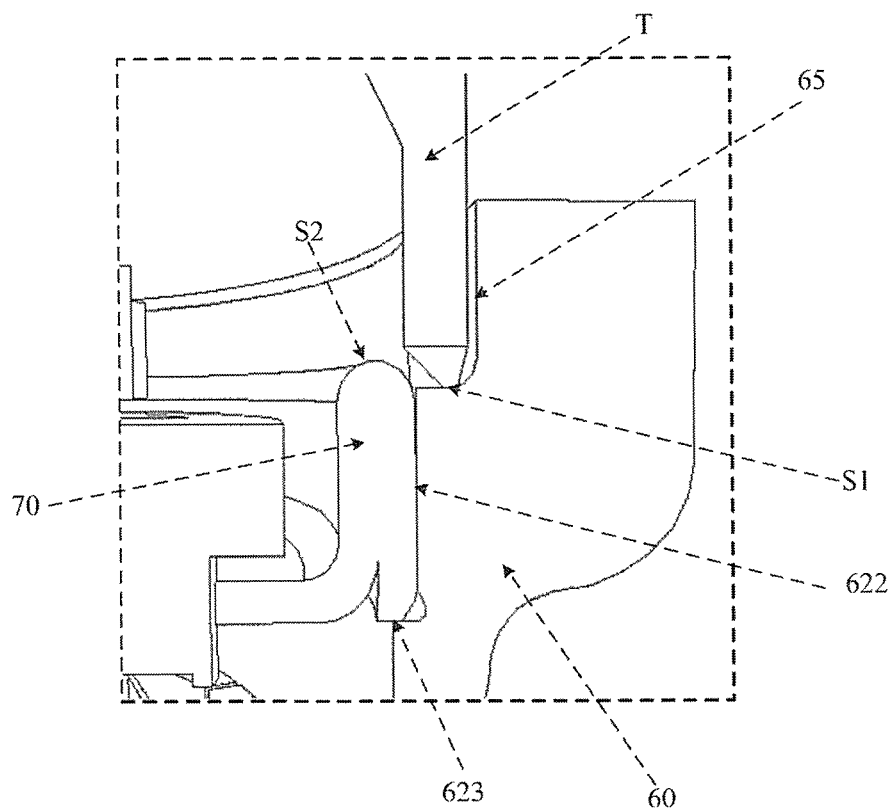
FIG. 5 is a partially enlarged schematic view of a housing and a bearing holder.

FIG. 5 is a partially enlarged cross-sectional view of the housing 60 and the bearing holder 70. As shown in FIG. 5, the riveting part 64 (not shown in FIG. 5) is provided by riveting the axially lower end of the groove 65 with the riveting tool T. An upper surface S1 of the axially lower end of the groove 65 is preferably lower than an upper surface S2 of an outer circumference of the bearing holder 70. In this case, since the riveting part 64 is bitten into the outer circumference of the bearing holder 70, circumferential deviation of the bearing holder 70 is able to be suppressed.

In some embodiments, as shown in FIG. 2 and FIG. 3, the housing 60 further includes a protrusion 66. The protrusion 66 protrudes radially outward from the second inner circumferential surface 622 of the cylindrical part 62. The groove 65 is located radially inside the protrusion 66. The riveting part 64 (not shown in FIG. 2 and FIG. 3) and the protrusion 66 are provided radially opposite each other.

Accordingly, by providing the groove 65 on the protrusion 66 having a radial thickness, a fixing strength of the riveting part 64 is improved.

In some embodiments, a cover 80 (to be described later) covering the opening 63 of the motor may be installed on the protrusion 66. The protrusion 66 may be provided with a through hole or a screw hole. Further, the protrusion 66 may serve as a portion for connection with other apparatuses.

In some embodiments, multiple grooves 65 are provided radially inside the protrusion 66, and multiple riveting parts 64 (not shown in FIG. 2 and FIG. 3) may also be provided. In this case, the riveting part 64 and the protrusion 66 are also provided radially opposite each other. Since the protrusion 66 is provided with multiple riveting parts 64, a fixing strength of the bearing holder 70 is further improved.

In the present embodiment, as shown in FIG. 2 and FIG. 3, two grooves 65 are provided radially inside the protrusion 66. Accordingly, two riveting parts 64 (not shown in FIG. 2 and FIG. 3) may be provided. As shown in FIG. 2, the housing 60 includes four protrusions, and there are eight riveting part 64 (not shown in FIG. 2). However, the disclosure is not limited thereto. The numbers of the protrusion 66, the groove 65, and the riveting part 64 may be changed as appropriate. In addition, a riveting part may also be provided on the axially upper side of the protrusion 66 and the cylindrical part 62, so as to fix the bearing holder 70. Or, a riveting part may be provided at other positions on the second inner circumferential surface 622, so as to fix the bearing holder 70.

Figure 6:
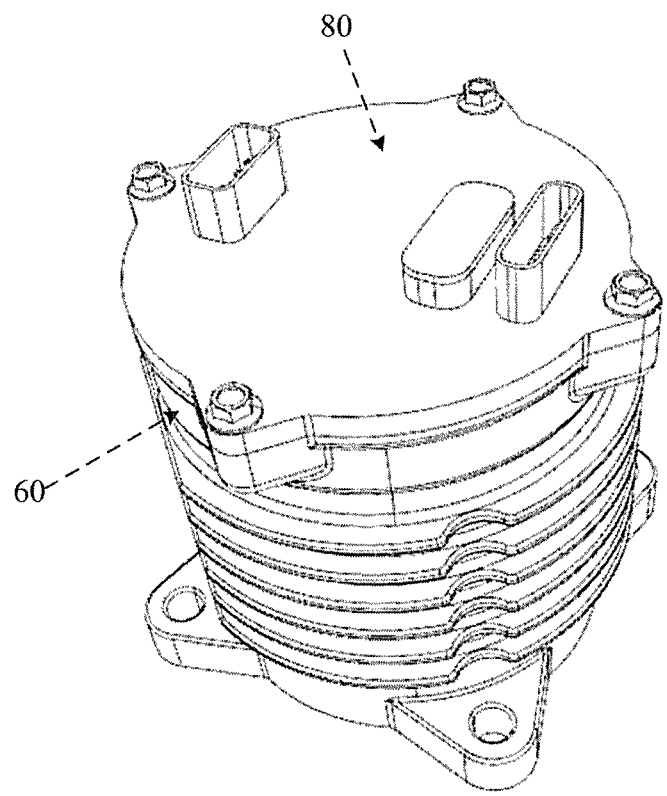
FIG. 6 is another schematic view of a motor of an embodiment of the disclosure.
Figure 7:
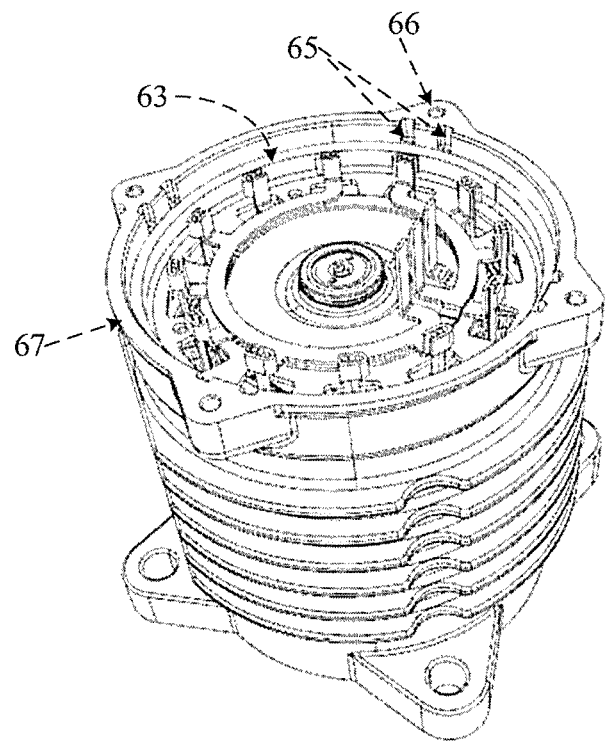
FIG. 7 is a schematic view of an internal configuration of the motor shown in FIG. 6.

FIG. 6 is another schematic view of a motor of an embodiment of the disclosure. FIG. 7 is a schematic view of an internal configuration of the motor shown in FIG. 6.

In some embodiments, as shown in FIG. 6 and FIG. 7, the motor further includes the cover 80 covering the opening 63 of the housing 60. As shown in FIG. 7, the housing 60 further includes a sealing member 67 axially located between the cylindrical part 62 and the cover 80. Moreover, the sealing member 67 is located radially outward of the groove 65. Accordingly, waterproof performance is able to be improved by the sealing member 67.

In an embodiment of the disclosure, the sealing member 67 may be defined by a hardened adhesive or liquid liner. For example, an adhesive or a liquid liner is applied to an upper surface of the cylindrical part 62 with a dispenser, and the cover 80 is provided on the upper surface of the cylindrical part 62 of the housing 60. The adhesive or the liquid liner is hardened to define the sealing member 67 that is able to prevent water from entering the inside of the motor. The sealing member 67 is provided radially outward of the groove 65. In other words, the adhesive or the liquid liner is applied to a position radially outward of the groove 65. Accordingly, a molding defect of the sealing member 67 caused by the adhesive or the liquid liner flowing into the groove 65 is able to be prevented, and the waterproof performance is improved.

In some embodiments, in the case where the protrusion 66 is provided and the groove 65 is not provided, the riveting part 64 and the protrusion 66 are provided radially opposite each other, and a circumferential length of the riveting part 64 is shorter than a circumferential length of the protrusion 66. According to this structure, by circumferentially providing a long riveting part on a portion of the housing having a radial thickness, the fixing strength is able to be improved. However, the disclosure is not limited thereto. It may also be that the circumferential length of the riveting part 64 is shorter than a circumferential length of the radially inside of the protrusion 66 and longer than a diameter of the screw hole of the protrusion 66. According to this structure, since no riveting pressure is not applied to a portion having a small radial thickness, deformation of the housing is able to be suppressed.

In some embodiments, the bearing holder 70 is provided by stamping. Accordingly, the bearing holder 70 may be provided in a very thin shape, thereby reducing the weight and the production cost.

Figure 8:
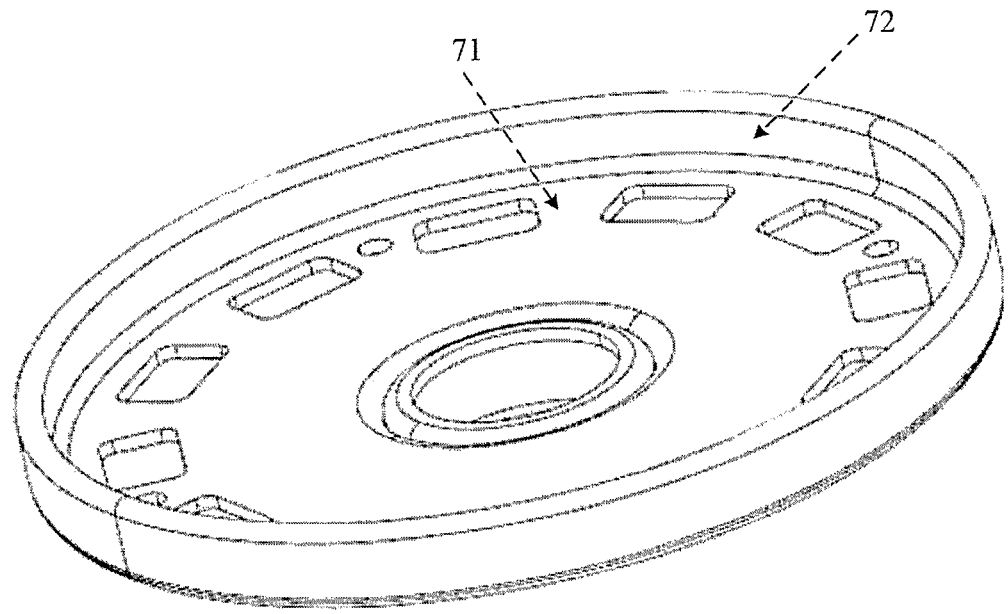
FIG. 8 is a schematic view of a bearing holder of a motor of an embodiment of the disclosure.
Figure 9:
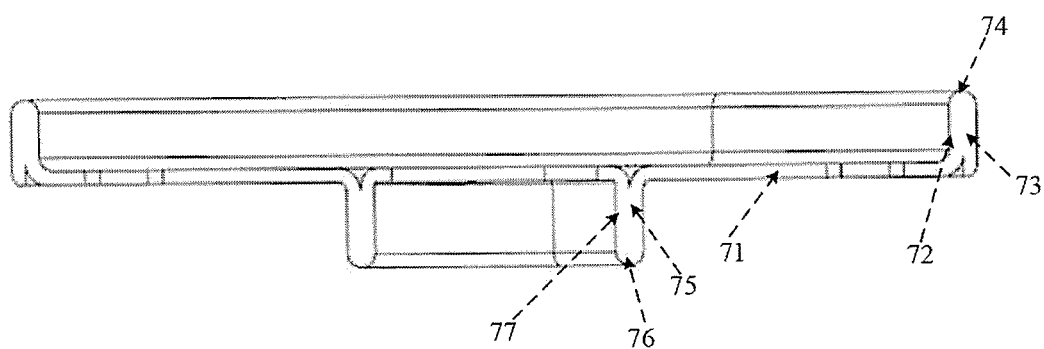
FIG. 9 is a schematic view of a cross section of the bearing holder shown in FIG. 8.

FIG. 8 is a schematic view of a bearing holder of a motor of an embodiment of the disclosure. FIG. 9 is a schematic view of a cross section of the bearing holder shown in FIG. 8.

In some embodiments, as shown in FIG. 8 and FIG. 9, the bearing holder 70 includes a second flat part 71 extending radially and a first tubular part 72 extending axially from a radially outer end of the second flat part 71. According to this structure, strength of the outer circumference of the bearing holder 70 is able to be improved.

In some embodiments, as shown in FIG. 9, the bearing holder 70 further includes a second tubular part 73 located radially outside the first tubular part 72 and a curved part 74 connecting the first tubular part 72 and the second tubular part 73. According to this structure, the strength of the outer circumference of the bearing holder 70 is able to be further improved.

In an embodiment of the disclosure, the bearing holder 70 may be manufactured by stamping. An outer circumference of the second flat part 71 of the bearing holder 70 is bent axially to define the first tubular part 72. By the first tubular part 72, rigidity and fastening strength of the outer circumference of the bearing holder 70 are improved. In addition, an axial end of the first tubular part 72 is bent radially outward, and may be folded back axially, thereby defining the curved part 74 and the second tubular part 73. Since the bearing holder 70 includes the first tubular part 72, the curved part 74 and the second tubular part 73, the rigidity of the outer circumference of the bearing holder 70 is improved. Moreover, since the first tubular part 72, the curved part 74 and the second tubular part 73 are provided on the outer circumference of the bearing holder 70, deformation of the bearing holder 70 during pressing into the housing is able to be absorbed, and concentricity is thus reliably ensured.

In some embodiments, the first tubular part 72 may extend downward from the radially outer end of the second flat part 71. In addition, a curved part may be defined radially from an axially lower end of the first tubular part 72, and a second tubular part may be defined by extending upward from the curved part. Accordingly, the strength of the outer circumference of the bearing holder 70 is also able to be further improved. The deformation of the bearing holder 70 during pressing into the housing is absorbed, and the concentricity is thus reliably ensured.

In addition, in the case of adopting a structure in which the first tubular part 72 extends upward from the radially outer end of the second flat part 71, the curved part 74 is defined radially outward from an axially upper side of the first tubular part 72, and the second tubular part 73 is defined by extending downward from the curved part 74, since the riveting part 64 and the second flat part 71 are able to be provided axially separated from each other, deformation of the second flat part 71 caused by riveting is able to be suppressed.

In some embodiments, as shown in FIG. 9, the second flat part 71 includes a third tubular part 75 extending axially from a radially inner end, and the second bearing 40 may be held by the third tubular part 75. Since a fastening length of the bearing holder 70 and the second bearing 40 is able to be achieved, even if the bearing holder 70 is a thin member manufactured by stamping, a sufficient fastening strength is able to be achieved.

In some embodiments, as shown in FIG. 9, an axial end of the third tubular part 75 may be bent radially inward, or may be folded back axially, thereby defining an inner curved part 76 and a fourth tubular part 77. Since the bearing holder 70 includes the third tubular part 75, the inner curved part 76 and the fourth tubular part 77, rigidity of an inner circumference of the bearing holder 70 is improved.

In some embodiments, the third tubular part 75 may extend downward from an axially inner end of the second flat part 71. In addition, an inner curved part may be defined radially from an axially lower end of the third tubular part 75, and the fourth tubular part 77 may be defined by extending upward from the inner curved part. By such a configuration, the second bearing 40 is able to be provided close to the rotor 10, and the length of the entire motor is able to be reduced.

In some embodiments, as shown in FIG. 9, the first tubular part 72 extends axially upward from the radially outer end of the second flat part 71, and the curved part 74 is located on the axially upper side of the first tubular part 72 and contacts the riveting part 64. Accordingly, the curved part 74 is thicker than other portions of the bearing holder 70 manufactured by stamping. Since riveting stress is applied to a portion having a thickness, the overall skew of the bearing holder 70 is able to be reduced.

In some embodiments, as shown in FIG. 5, the upper surface S1 of the axially lower end of the groove 65 is located lower than an upper end (upper surface S2) of the curved part 74. In this case, since the riveting part 64 is bitten into the curved part 74, circumferential deviation of the bearing holder 70 is able to be suppressed.

For greater clarity and comprehension of the implementations of the embodiments of the disclosure, the position of the riveting part 64 will be described below by way of several schematic views.

Figures 10A, 10B:
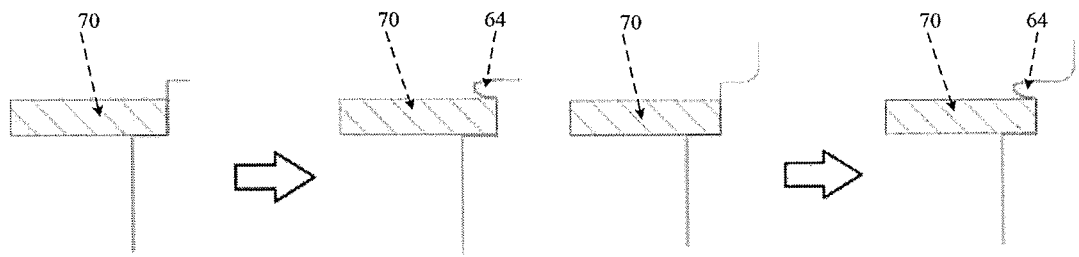
FIG. 10A and FIG. 10B are schematic views showing that a bearing holder is fixed to a second inner circumferential surface of a cylindrical part by riveting.

FIG. 10A and FIG. 10B are schematic views showing that the bearing holder 70 is fixed to the second inner circumferential surface 622 of the cylindrical part 62 by riveting. In the example of FIG. 10A and FIG. 10B, the bearing holder 70 has a shape of a flat plate, and the riveting part 64 may be defined by riveting from an upper end of the housing 60 (see FIG. 10A) or a lower end of the groove 65 (see FIG. 10B).

Figure 11A:
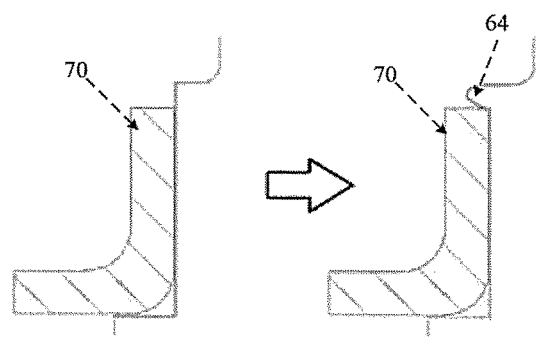
FIG. 11A and FIG. 11B are other schematic views showing that a bearing holder is fixed to a second inner circumferential surface of a cylindrical part by riveting.
Figure 11B:
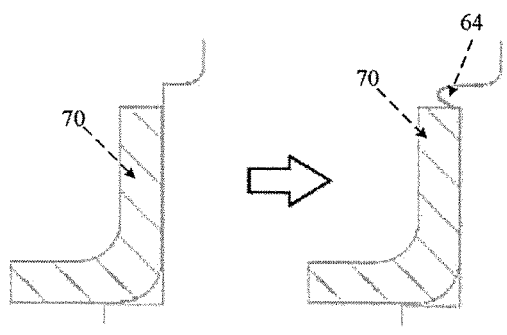

FIG. 11A and FIG. 11B are other schematic views showing that the bearing holder 70 is fixed to the second inner circumferential surface 622 of the cylindrical part 62 by riveting. In the example of FIG. 11A and FIG. 11B, the bearing holder 70 includes a curved part, and the riveting part 64 may be defined by riveting from the upper end of the housing 60 (see FIG. 11A) or the lower end of the groove 65 (see FIG. 11B).

Figure 12A:
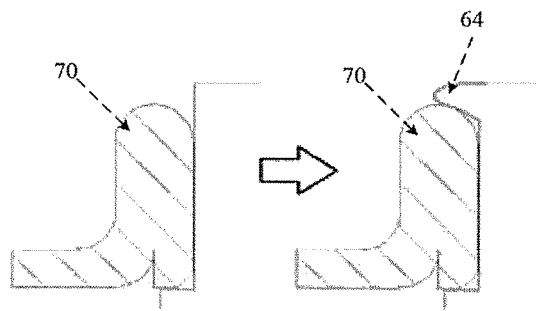
FIG. 12A and FIG. 12B are still other schematic views showing that a bearing holder is fixed to a second inner circumferential surface of a cylindrical part by riveting.
Figure 12B:
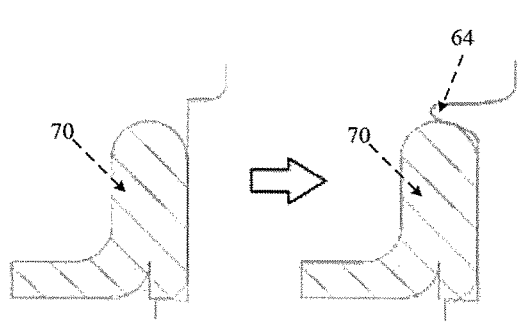

FIG. 12A and FIG. 12B are still other schematic views showing that the bearing holder 70 is fixed to the second inner circumferential surface 622 of the cylindrical part 62 by riveting. In the example of FIG. 12A and FIG. 12B, the bearing holder 70 includes a double curved part, and the riveting part 64 may be defined by riveting from the upper end of the housing 60 (see FIG. 12A) or the lower end of the groove 65 (see FIG. 12B).

It is worth noting that the above is only an exemplary description of the configuration of the motor related to the disclosure. However, the disclosure is not limited thereto, and appropriate modifications may be made on the basis of the above embodiments. In addition, the above is only an exemplary description of each member. However, the disclosure is not limited thereto, and specific content of each member may be understood from the related art. In addition, members not shown in FIG. 1 to FIG. 9 may be added, or one or more of the members in FIG. 1 to FIG. 9 may be omitted. Other configurations and structures of the motor may be understood from the related art and their description is omitted herein.

According to the motor of the embodiments of the disclosure, by fixing the bearing holder by riveting, limitations on the disposition of the through hole are able to be reduced.

An embodiment of the disclosure provides an electrical product including the motor described as above. Since the structure of the motor has been described in detail as above, the description will not be repeated.

In an embodiment of the disclosure, the electrical product may be an arbitrary electrical apparatus provided with a motor. Examples thereof include: a household appliance such as an indoor unit of an air conditioner, an outdoor unit of an air conditioner, a water dispenser, a washing machine, a sweeper, a compressor, a blower, and a mixer; an industrial apparatus such as a pump, a conveyor, an elevator, a standard industrial general-purpose machine, a wind turbine, a grinder, and a traction motor; various information processing apparatuses; and various parts of an automobile, such as an automobile electric power steering system, an automobile sunroof adjustment part, a seat adjustment part, a transmission, and a brake.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, comprising:
   a rotor, rotating about a central axis;
   a stator, located radially outside the rotor and provided opposite the rotor, having a plurality of coils wound therearound;
   a first bearing and a second bearing, rotatably supporting the rotor relative to the stator;
   a support member, located on an axially upper side of the stator and holding a conductive member that supplies power to the plurality of coils;
   a housing, comprising a first flat part extending radially and a cylindrical part extending axially upward from a radially outer edge of the first flat part, thereby defining an opening that opens on an axially upper side, the first flat part holding the first bearing, the cylindrical part accommodating the rotor and the stator radially inside thereof; and
   a bearing holder, provided on the axially upper side of the stator, holding the second bearing, and having at least one through hole through which the conductive member and/or a lead wire of the coils extends toward an upper side of the bearing holder;
   wherein the cylindrical part comprises:
      a first inner circumferential surface, the stator being provided inside the first inner circumferential surface;
      a second inner circumferential surface, a distance from the second inner circumferential surface to the central axis being greater than a distance from the first inner circumferential surface to the central axis, and the second inner circumferential surface contacting an outer circumferential surface of the bearing holder; and a stepped surface, connecting the first inner circumferential surface and the second inner circumferential surface, and contacting a lower surface of the bearing holder, wherein the housing further comprises a riveting part located on the second inner circumferential surface of the cylindrical part, and the bearing holder is fixed to the second inner circumferential surface of the cylindrical part by the riveting part.

2. The motor as claimed in claim 1, wherein
the housing further comprises a groove located on the second inner circumferential surface and extending axially;
the riveting part is located at an axially lower end of the groove.

3. The motor as claimed in claim 2, wherein
the housing further comprises a protrusion protruding radially outward from the second inner circumferential surface of the cylindrical part;
the groove is located radially inside the protrusion;
the riveting part and the protrusion are provided radially opposite each other.

4. The motor as claimed in claim 3, wherein
the motor further comprises a cover covering the opening of the housing;
the housing further comprises a sealing member axially located between the cylindrical part and the cover, and the sealing member is located radially outward of the groove.

5. The motor as claimed in claim 1, wherein
the housing further comprises a protrusion protruding radially outward from the second inner circumferential surface of the cylindrical part;
the riveting part and the protrusion are provided radially opposite each other, and a circumferential length of the riveting part is shorter than a circumferential length of the protrusion.

6. The motor as claimed in claim 1, wherein
the bearing holder is provided by stamping.

7. The motor as claimed in claim 6, wherein the bearing holder comprises:
a second flat part extending radially; and
a first tubular part extending axially from a radially outer end of the second flat part.

8. The motor as claimed in claim 7, wherein the bearing holder further comprises:
a second tubular part located radially outside the first tubular part; and
a curved part connecting the first tubular part and the second tubular part.

9. The motor as claimed in claim 8, wherein
the first tubular part extends axially upward from a radially outer end of the second flat part, and
the curved part is located on an axially upper side of the first tubular part and contacts the riveting part.

10. An electrical product, comprising:
the motor as claimed in claim 1.

* * * * *